April 17, 1956 H. W. ROCKWELL 2,742,100
EARTH MOVER POWER STEERING MECHANISM
Filed Jan. 8, 1952 2 Sheets-Sheet 1
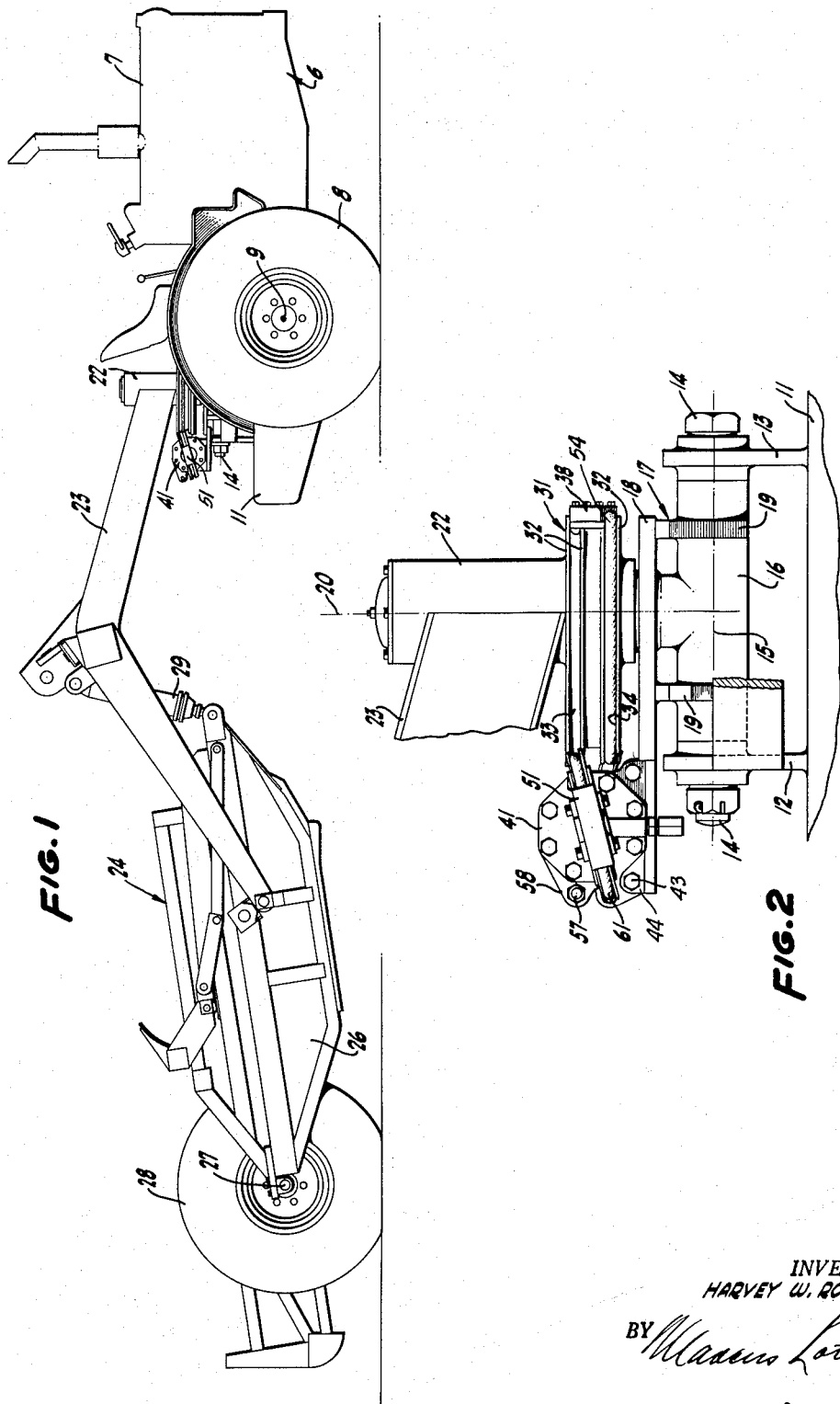
INVENTOR.
HARVEY W. ROCKWELL
BY
ATTORNEY

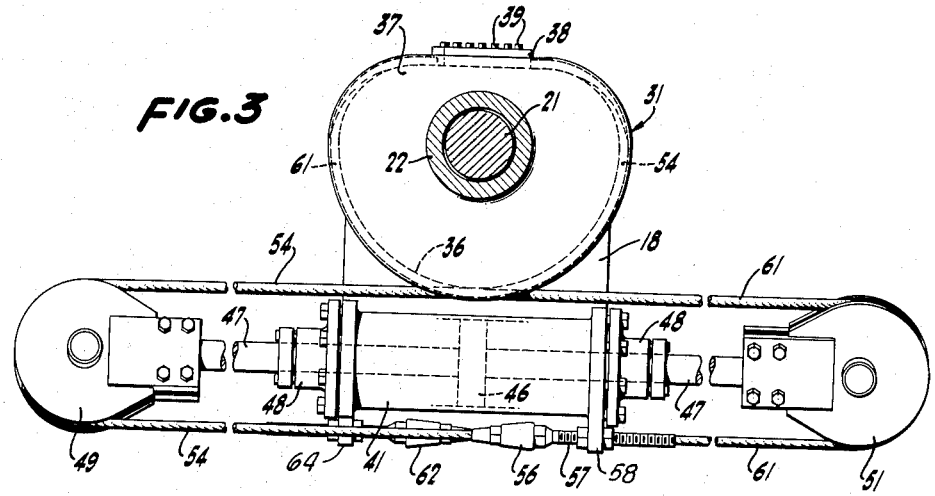
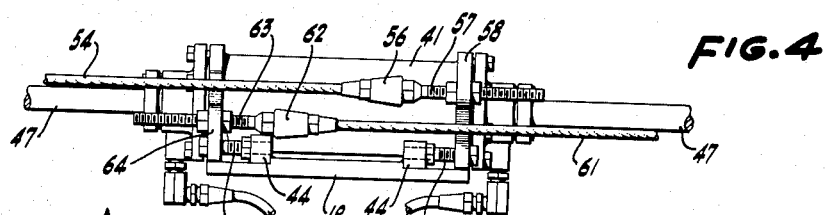
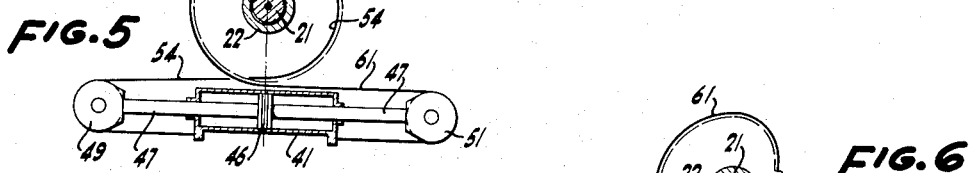
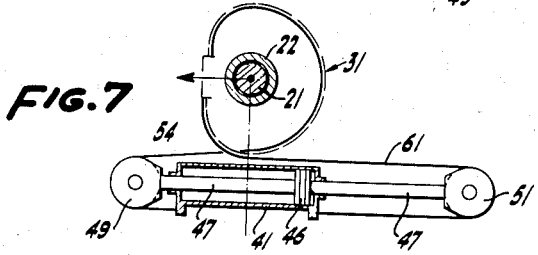

United States Patent Office 2,742,100
Patented Apr. 17, 1956

2,742,100

EARTH MOVER POWER STEERING MECHANISM

Harvey W. Rockwell, Cedar Rapids, Iowa, assignor, by mesne assignments, to Allis-Chalmers Manufacturing Company, a corporation of Delaware Application January 8, 1952, Serial No. 265,517

6 Claims. (Cl. 180—79.2)

My invention relates to means for effectuating the steering movement of a composite vehicle made up of a tractor unit and a trailer unit. In the earth mover field, such vehicles are articulated at least by means of a rotatable joint or "fifth wheel" arranged to pivot about a vertical axis between the units. In many instances the articulation also includes a mechanism for affording pivotal motion about a fore and aft longitudinal, horizontal axis usually intersecting the vertical axis although not necessarily so.

In the steering of such a fifth wheel articulation, it is highly desirable to afford a steering motion of at least 90 degrees either side of the center or straight ahead position, making a total turning angle of at least 180 degrees. It is also desirable to have a positive steering mechanism not disturbed by external forces such as irregularities in the terrain and not subject to "jack knifing" or overhauling of the tractor vehicle by the trailer vehicle.

It is therefore an object of my invention to provide an improved earth mover steering mechanism.

Another object of my invention is to provide an earth mover steering mechanism which will afford at least 180 degrees steering movement.

A still further object of my invention is to provide an earth mover steering mechanism which positively actuates in both directions of operation.

A still further object of my invention is to provide an earth mover steering mechanism which is simple and is comprised of parts which are of the nature usually found on earth moving mechanisms.

An additional object of the invention is to provide an earth mover steering mechanism of sufficient strength in all positions of the tractor and trailer vehicles to hold them in the selected relative position of steer.

Other objects, together with the foregoing, are attained in the embodiment of the invention described in the accompanying description and illustrated in the accompanying drawings in which Figure 1 is a side elevation of an earth mover equipped with a steering mechanism according to the present invention, certain portions being shown conventionally and certain parts being omitted for improved clarity of disclosure.

Figure 2 is a side elevation of the steering mechanism as applied to an earth mover, certain portions of the adjacent mechanism being broken away to reduce the size of the figure.

Figure 3 is a plan of the structure shown in Figure 2, certain portions being broken away to reduce the extent of the figure.

Figure 4 is a rear elevation of a portion of the structure shown in Figure 3, other portions being broken away.

Figure 5 is a diagram similar to Figure 3 and with some portions distorted showing the steering mechanism in the central or straight ahead position.

Figure 6 is a vew similar to Figure 5 but showing the parts with the trailer extended to the left of the tractor or in a position for effectuating a turn of 90 degrees to the left.

Figure 7 is a view similar to Figure 5 yet showing the parts of the steering mechanism in the position assumed to effectuate a turn of 90 degrees to the right.

Although the steering mechanism of my invention is characterized and illustrated herein as being especially adapted for use in connection with earth movers, it has other applications as well. However, for convenience in disclosure and description herein, it is described as it has successfully been incorporated in one version of earth mover. In this instance, there is provided a tractor 6 provided with the customary power plant 7 designed to drive a forward pair of ground engaging wheels 8 which themselves are rotatable about a horizontal axis 9. The vehicle 6 includes a housing 11 (Figure 2) from which a pair of abutments or walls 12 and 13 are upstanding. Spanning the space between the abutments 12 and 13 is a longitudinal hinge bolt 14 disposed in a fore and aft direction on a horizontal longitudinal central axis 15 of the vehicle 6.

Journaled on the hinge bolt 14 is a sleeve 16 forming part of an intermediate member, generally designated 17, and including a mounting plate 18. Suitable reinforcements 19 extend between the sleeve 16 and the plate 18. Upstanding from the remaining portion of the intermediate member and included therein is a pivot shaft 21, the axis 20 of which is substantially vertical and which preferably intersects the axis 15 of the hinge bolt 14. Journaled on the pin 21 is a housing 22 included in the frame 23 of a trailer, generally designated 24, and illustrated in Figure 1 as an earth scraper. The trailer 24 includes side panels 26 terminating in axles 27 for a pair of rearward ground engaging wheels 28 in the customary fashion. A mechanism 29 is utilized for adjusting the relationship of the parts of the scraper 24 but in effect and for the purposes of this description the trailer can be considered as a unitary device arranged to pivot in a generally horizontal direction about the axis of the pin 21 with respect to the tractor 6 and to pivot in a vertical direction about the axis of the hinge bolt 14 with respect to the tractor 6.

In accordance with my invention, I provide means for establishing and controlling the relative angular or steering position of the trailer 24 and the tractor 6 about the axis of the pin 21. In other words, I provide a mechanism for adjusting a pair of pivotally interconnected members relative to each other about a common pivot axis 20.

Secured to the housing 22 is a drum like torque transmitting element in the form of a cable guide 31. This structure is preferably fabricated of plates and shapes and includes four superposed plates 32 arranged to define between them at least an upper cable groove 33 and a lower cable groove 34. In plan outline, as shown in Figure 3, the cable guide 31 is inclusive of a rearward peripheral portion 36 spaced radially from axis 20 and extending arcuately thereabout through an angle at least 180 degrees and a remaining forward portion 37 considerably flattened from a true semi-circular contour. This arrangement is therefore such as to provide a pair of flanged grooves for the most part of equal radii with respect to the axis of the shaft 21 and superposed with respect to each other, yet leaving a forward flattened and unflanged portion substantially devoid of curvature immediately ahead of the shaft 21 yet fixed with respect to the casing 22.

In the forward central portion of the cable guide so formed I provide a cable anchor 38. This is comprised primarily of a pair of split blocks contoured internally to receive a single cable or a pair of cable ends passed between them. The blocks have a plurality of fasteners 39 for firmly clamping the cable in place against slippage. The anchor 38 has an additional function in that it is arranged on the forward face of the cable guide at an inclination to the horizontal so that a cable disposed between flanges in the upper groove 33, for example, is conducted to the lower groove 34 and is thereafter confined between the side flanges of the lower groove.

Disposed immediately behind the cable guide 31 and located substantially centrally on the plate 18 of the intermediate member to the rear of the housing 22 is a hydraulic jack cylinder 41. Preferably, this cylinder is mounted by a rearward pair of adjustable stay bolts 42 and 43 engaging upstanding lugs 44 on the central rear margin of the plate 18. The mounting arrangement is duplicated on the forward portion of the jack cylinder. In this way the jack is firmly mounted at four points on the plate 18, yet is adjustable transversely of the longitudinal axis of the intermediate member.

Slidably situated within the jack cylinder 41 is a jack piston 46 fast on an elongated thrust transmitting element in the form of a piston rod 47 which projects outwardly from both ends of the jack cylinder through appropriate cylinder heads and packings 48. Cylinder 41, piston 46 and piston rod 47 are mounted on plate 18 of the intermediate member 17 so that the piston rod 47 may reciprocate on a line lying in a plane extending through the peripheral portion 36 of the torque transmitting element 31 at right angles to axis 20. At the left hand end of the piston rod 47 (to the left of the central longitudinal axis as seen in Figure 3) there is rotatably mounted a cable sheave 49 which by virtue of its mounting travels in unison with the piston rod 47 and the piston 46. Quite similarly, at the right hand end of the piston rod 47, with reference to the central longitudinal axis, there is rotatably mounted a similar cable sheave 51 which because of its mounting not only moves in unison with the piston 46 but also moves in unison with respect to the cable sheave 49.

The jack cylinder 41 is appropriately actuated and translated by means of hydraulic fluid from a standard system, not shown, having access to the jack cylinder through conduits 52 and 53. When the jack is appropriately actuated, therefore, the sheaves 49 and 51 are translated transversely of the longitudinal axis of the vehicle. When one sheave approaches the central axis, the other sheave recedes from such axis and vice versa.

The cable portions (either a continuous line or two separate lines) which are anchored by the blocks 38 on the front portion of the torque transmitting element 31 are first passed substantially halfway around the torque transmitting element 31. That is, one of the cable portions 54 is passed around the right hand side of the cable guide in the lower groove 34, as seen in Figure 3, and then extends tangentially from such guide to the left hand side of the longitudinal axis and is then reeved around the sheave 49 substantially a half turn. The remaining portion of this cable portion then extends to a cable anchor 56 connected through an adjustment bolt 57 to a bracket 58 outstanding from the jack cylinder 41 and is thus fixed with respect to the intermediate member and with respect to the longitudinal axis of the device.

Quite comparably, the other cable portion 61 extending from the anchor 38 passes or is trained around the left hand side of the torque transmitting element 31 as seen in Figure 3, being disposed in the upper groove 33 and then passes tangentially from such cable guide around the right hand sheave 51. It passes substantially a half turn around that sheave and then returns toward the center of the structure to be fastened by a cable anchor 62 including an adjusting bolt 63 fastened to a bracket 64 outstanding from the jack cylinder 41. The two cable portions 61 and 54 can be as a matter of fact and are usually in practice made as portions of the same cable which passes continuously through the anchor 38. However, if desired, two separate cable lengths can be utilized with the adjacent ends of both anchored or clamped by means of the anchor 38. In either instance by appropriate manipulation of the adjusting bolts 63 and 57 the user can arrange for substantially equal tautness of the two cable portions and arrange to have the piston 46 substantially centrally disposed within the jack cylinder when the tractor and trailer units are both in alignment facing straight ahead. In addition, the adjustments 42 and 43 can also be utilized to centralize the setup.

Because the cable portions 61 and 54 are reeved in different grooves, that is in upper and lower grooves in the cable guide, the sheaves 49 and 51 are mounted at the ends of the piston rod 47 with their general planes or axes of rotation not vertically disposed but at an inclination sufficient to pass the cable length from its upper elevation to its lower elevation and vice versa. In this way it is possible to have overlapped portions of the cable when seen in a vertical direction, yet to have the cable spaced apart for operation, ready adjustment and manipulation when seen in a horizontal direction. The cable portions 54 and 61 are reeved about sheaves 49 and 51, respectively, and disposed between the torque transmitting element 31 and brackets 58 and 64, respectively, so as to be substantially symmetrical about the line of movement of said piston rod 47. When this symmetrical condition of the cable portions is present, the piston rod 47 is not subjected to objectionable side thrust. Also the positioning of the sheaves 49 and 51 on inclined planes and the horizontal spacing of the peripheral portion 36 from the sheaves provides a structure such that the parts of the cable portions 49 and 51 passing between the peripheral portion 36 of the torque transmitting element 31 and the sheaves 49 and 51, respectively, lie in tangents common to the peripheral portion 36 of the torque transmitting element 31 and the sheaves 49 and 51, respectively.

In the operation of this structure, the user regulates the hydraulic system in such a way as to supply hydraulic fluid under pressure to one end of the jack cylinder 41 while permitting the fluid to be released from the other end thereof. This causes a translation of the piston 46 within the jack cylinder and retracts one of the sheaves, 49 for example, as it advances or projects the other sheave 51. Since one end of each of the cable lengths is anchored on the framework afforded by the intermediate member, the only alternative is for one of the cable portions, 61 for example, to pay off of the cable guide 31 as the other cable length 54 winds onto the cable guide. That can be accomplished only by a relative rotation of the tractor 6 with respect to the trailer 24 about the vertical axis of the shaft 21. The exent of travel of the piston within the double acting cylinder is sufficient with respect to the contour or circumference of the cable guide so that any angularity of steering up to substantially a 90 degree turn is effected to one side of the straight ahead position.

When the operator wishes to turn in the opposite direction, he has but to reverse the direction of hydraulic flow to the hydraulic double acting jack cylinder 41 and a reversal in transverse movement of the sheaves 49 and 51 accompanied by a reversal in the paying out and taking up of the cable portions with respect to the cable guide occurs. The arrangement is such that any degree of steer up to substantially a 90 degree turn in the opposite direction can be effectuated. With a slight change in dimensions, turns in excess of 90 degrees can be made.

In any relative steered position of the units, both of the cable portions remain substantially under tension so that there is little or no play or lost motion between the tractor and the trailer. That is, any disturbing movement transmitted from the tractor to the trailer through the steering mechanism is transmitted through the cables and is resisted ultimately by the hydraulic piston and cylinder. Conversely, any disturbing forces transmitted from the trailer to the tractor and passing through the steering mechanism are likewise transmitted by the cables and are resisted by the hydraulic jack mechanism. At any time any looseness or slack or lost motion develops in the motion train, adequate adjustment is provided for taking it up. If the cable should ever fail or show signs of failing, it can quite readily be removed and rereeved with the customary tools and the customary technique available in connection with earth moving equipment.

The entire steering structure takes up very little room on the tractor-trailer mechanism and yet without complicated linkages and without special steering geometry affords a steering mechanism for providing a wide angularity of steer.

In general, therefore, the earth mover steering mechanism provided in accordance with the present invention is a simple, direct, accurate and effective mechanism for providing improved results.

What is claimed is:

1. A mechanism for adjusting a pair of pivotally interconnected members relative to each other about a common pivot axis, said mechanism comprising, a drum like torque transmitting element mounted on one of said members for rotation therewith and having a peripheral portion spaced radially from said pivot axis and extending arcuately thereabout through an angle of at least 180 degrees, an elongated thrust transmitting element extending transversely of said pivot axis and mounted on said other member for linear reciprocating movement relative thereto in a plane extending through said peripheral portion of said torque transmitting element at right angles to said pivot axis, hydraulic actuating means for said thrust transmitting element including a cylinder operatively mounted on said other member and enclosing a piston secured to said thrust transmitting element at a portion of the latter intermediate the longitudinally opposite ends thereof, a pair of sheaves rotatably mounted, respectively, on said opposite ends of said thrust transmitting element, and cable portions reeved, respectively, about said sheaves and connected to said torque transmitting element and to said other member for effecting pivotal adjustment of said members relative to each other through an angle of at least 180 degrees by movement of said piston from one end of said cylinder to the other.

2. The mechanism set out in claim 1 wherein the parts of said cable portions reeved about said sheaves, respectively, and disposed between said torque transmitting element and said other member are substantially symmetrical about the line of movement of said thrust transmitting element.

3. The mechanism set out in claim 2 and further comprising adjustable mounting means operable to change the position of said cylinder relative to said other member in the direction of the line of movement of said thrust transmitting element.

4. The mechanism set out in claim 2 and further comprising means interposed between said cable portions and said other member for adjusting the tautness of said cable portions.

5. A mechanism for adjusting a pair of pivotally interconnected members relative to each other about a common pivot axis, said mechanism comprising, a drum like torque transmitting element mounted on one of said members for rotation therewith having a peripheral portion spaced radially from said pivot axis and extending arcuately thereabout, an elongated thrust transmitting element extending transversely of said pivot axis and mounted on said other member for linear reciprocating movement relative thereto in a plane extending through said peripheral portion of said torque transmitting element at right angles to said pivot axis, hydraulic actuating means for said thrust transmitting element including a cylinder operatively mounted on said other member and enclosing a piston secured to said thrust transmitting element at a portion of the latter intermediate the longitudinally opposite ends thereof, a pair of sheaves rotatably mounted, respectively, on said opposite ends of said thrust transmitting element, and cable portions reeved, respectively, about said sheaves and connected to said torque transmitting element and to said other member for effecting pivotal adjustment of said members relative to each other by movement of said piston from one end of said cylinder to the other, said sheaves and said peripheral portion of said torque transmitting element being horizontally spaced from one another so that the parts of said cable portions passing between said peripheral portion of said torque transmitting element and said sheaves, respectively, lie in tangents common to said peripheral portion of said torque transmitting element and said sheaves, respectively.

6. In an articulated vehicle comprising a two wheel tractor unit and a trailer unit connected together for pivotal movement relative to each other about a vertical pivot axis, the combination of a drum like torque transmitting element mounted on one of said units for rotation therewith and having a peripheral portion spaced radially from said pivot axis and extending arcuately thereabout through an angle of at least 180 degrees, an elongated thrust transmitting element extending transversely of said pivot axis and mounted on said other member for linear reciprocating movement relative thereto in a plane extending through said peripheral portion of said torque transmitting element at right angles to said pivot axis, hydraulic actuating means for said thrust transmitting element including a cylinder operatively mounted on said other member and enclosing a piston secured to said thrust transmitting element at a portion of the latter intermediate the longitudinally opposite ends thereof, a pair of sheaves rotatably mounted, respectively, on said opposite ends of said thrust transmitting element, and cable portions reeved, respectively, about said sheaves and connected to said torque transmitting element and to said other member for effecting pivotal adjustment of said members relative to each other through an angle of at least 180 degrees by movement of said piston from one end of said cylinder to the other.

References Cited in the file of this patent

UNITED STATES PATENTS

| Number | Name | Date |
| --- | --- | --- |
| 360,603 | Martin | Apr. 5, 1887 |
| 499,569 | Oglethorpe | June 13, 1893 |
| 509,511 | Craig | Nov. 28, 1893 |
| 526,930 | Maxon | Oct. 2, 1894 |
| 540,628 | Bothwell | June 11, 1895 |
| 917,684 | Van Nort | Apr. 6, 1909 |
| 935,610 | Mauksch | Sept. 28, 1909 |
| 1,692,666 | Koons | Nov. 20, 1928 |
| 2,347,882 | Choate et al. | May 2, 1944 |
| 2,362,262 | French | Nov. 7, 1944 |
| 2,400,218 | Akers | May 14, 1946 |
| 2,532,785 | Richter | Dec. 5, 1950 |